(12) United States Patent
Hashiguchi

(10) Patent No.: US 12,448,489 B2
(45) Date of Patent: Oct. 21, 2025

(54) RESIN FILM

(71) Applicant: KANEKA CORPORATION, Osaka (JP)

(72) Inventor: Tomoaki Hashiguchi, Settsu (JP)

(73) Assignee: KANEKA CORPORATION, Osaka (JP)

( * ) Notice: Subject to any disclaimer, the term of this patent is extended or adjusted under 35 U.S.C. 154(b) by 391 days.

(21) Appl. No.: 18/003,642

(22) PCT Filed: Jun. 28, 2021

(86) PCT No.: PCT/JP2021/024311
§ 371 (c)(1),
(2) Date: Dec. 28, 2022

(87) PCT Pub. No.: WO2022/004637
PCT Pub. Date: Jan. 6, 2022

(65) Prior Publication Data
US 2023/0235137 A1    Jul. 27, 2023

(30) Foreign Application Priority Data

Jun. 29, 2020 (JP) .................................. 2020-111919

(51) Int. Cl.
*C08J 5/18* (2006.01)
*C08L 67/04* (2006.01)

(52) U.S. Cl.
CPC .................. *C08J 5/18* (2013.01); *C08L 67/04* (2013.01); *C08J 2367/04* (2013.01); *C08J 2467/04* (2013.01); *C08L 2203/16* (2013.01); *C08L 2205/025* (2013.01)

(58) Field of Classification Search
CPC ........ C08G 63/00; C08G 63/02; C08G 63/06; C08G 63/08; C08L 67/04
See application file for complete search history.

(56) References Cited

U.S. PATENT DOCUMENTS

2010/0305280 A1* 12/2010 Whitehouse ............ C08L 67/04
 525/450
2017/0198136 A1    7/2017 Minami et al.

FOREIGN PATENT DOCUMENTS

| JP | 2005-162884 A | 6/2005 |
| JP | WO 2015/146194 A1 | 10/2015 |
| JP | 2017-222791 A | 12/2017 |

OTHER PUBLICATIONS

International Search Report mailed on Sep. 21, 2021 in PCT/JP2021/024311 filed on Jun. 28, 2021 (3 pages).

* cited by examiner

*Primary Examiner* — Zachary M Davis
(74) *Attorney, Agent, or Firm* — Oblon, McClelland, Maier & Neustadt, L.L.P.

(57) ABSTRACT

Provides is a resin film containing a poly(3-hydroxyalkanoate) resin component. A tensile modulus of the resin film is from 500 to 2000 MPa. A swelling degree of the resin film, as measured by immersion of the resin film in methyl ethyl ketone for two hours, is from 1 to 5. Preferably, the poly (3-hydroxyalkanoate) resin component is a mixture of at least two poly(3-hydroxyalkanoate) resins differing in types and/or contents of constituent monomers.

16 Claims, No Drawings

RESIN FILM

CROSS-REFERENCE TO RELATED APPLICATIONS

This application is a national stage of International Patent Application No. PCT/JP2021/024311 filed on Jun. 28, 2021, and claims priority to Japanese Application No. 2020-111919 filed on Jun. 29, 2020, the disclosures of which are incorporated herein by reference in their entireties.

TECHNICAL FIELD

The present invention relates to a resin film containing a poly(3-hydroxyalkanoate) resin component.

BACKGROUND ART

A huge amount of petroleum-based plastics are discarded as waste every year. The huge amount of waste plastics have brought about the problems of a shortage of landfill sites and environmental pollution, and these problems have become a serious concern. Additionally, in recent years, microplastics have caused significant harm to the marine environment.

Poly(3-hydroxyalkanoate) resins are highly degradable in seawater and can be a solution to the environmental problems induced by plastics discarded as waste. For example, poly(3-hydroxybutyrate-co-3-hydroxyhexanoate) is one of the poly(3-hydroxyalkanoate) resins, and the mechanical properties of this resin can be flexibly controlled by changing the proportion of 3-hydroxyhexanoate.

However, increasing the proportion of 3-hydroxyhexanoate tends to cause a reduction in productivity although the increased proportion of 3-hydroxyhexanoate leads to a decrease in crystallinity and hence an improvement in mechanical properties. To achieve mechanical properties required of a molded article such as a film, the proportion of 3-hydroxyhexanoate needs to be increased to such a degree that industrial production of the article becomes extremely difficult. This makes it hard to obtain a molded article that is satisfactory in both productivity and mechanical properties by using a poly(3-hydroxyalkanoate) resin.

Patent Literature 1 describes a polyester resin composition containing two polyhydroxyalkanoates in order to improve the solidification characteristics and increase the processing rate in melt molding, and mentions a film and a sheet as examples of molded articles of the polyester resin composition.

CITATION LIST

Patent Literature

PTL 1: WO 2015/146194

SUMMARY OF INVENTION

Technical Problem

With the use of the polyester resin composition described in Patent Literature 1, a film can be produced with high productivity. However, the resulting film lacks sufficient tearing resistance, and it is difficult to ensure both film tearing resistance and film productivity.

In view of the above circumstances, the present invention aims to provide a resin film containing a poly(3-hydroxyalkanoate) resin component, the resin film having a high tearing resistance and being producible with high productivity.

Solution to Problem

As a result of intensive studies with the goal of solving the above problem, the present inventors have found that when a resin film contains a poly(3-hydroxybutyrate) resin component and is adapted to have a tensile modulus and a swelling degree which fall within specific numerical ranges, respectively, the resin film can have a high tearing resistance and be produced with high productivity. Based on this finding, the inventors have completed the present invention.

Specifically, the present invention relates to a resin film containing a poly(3-hydroxyalkanoate) resin component, wherein a tensile modulus of the resin film is from 500 to 2000 MPa, and a swelling degree of the resin film, as measured by immersion of the resin film in methyl ethyl ketone for two hours, is from 1 to 5.

Preferably, the poly(3-hydroxyalkanoate) resin component is a mixture of at least two poly(3-hydroxyalkanoate) resins differing in types and/or contents of constituent monomers.

Preferably, the poly(3-hydroxyalkanoate) resin component includes a copolymer of 3-hydroxybutyrate units and other hydroxyalkanoate units.

More preferably, the poly(3-hydroxyalkanoate) resin component includes: a copolymer (A) which is a copolymer of 3-hydroxybutyrate units and other hydroxyalkanoate units and in which a content of the other hydroxyalkanoate units is from 1 to 6 mol %; and a copolymer (B) which is a copolymer of 3-hydroxybutyrate units and other hydroxyalkanoate units and in which a content of the other hydroxyalkanoate units is 24 mol % or more.

Preferably, in the poly(3-hydroxyalkanoate) resin component, a proportion of the copolymer (A) is 35 wt % or more, and a proportion of the copolymer (B) is 65 wt % or less.

Preferably, an average content of the other hydroxyalkanoate units in total monomer units constituting the poly(3-hydroxyalkanoate) resin component is from 8 to 18 mol %.

Preferably, the other hydroxyalkanoate units are 3-hydroxyhexanoate units.

Preferably, a tearing resistance of the resin film is from 2 to 200 N/mm.

Preferably, a thickness of the resin film is from 10 μm to 1 mm.

Advantageous Effects of Invention

The present invention can provide a resin film containing a poly(3-hydroxyalkanoate) resin component, the resin film having a high tearing resistance and being producible with high productivity.

DESCRIPTION OF EMBODIMENTS

Hereinafter, embodiments of the present invention will be described. The present invention is not limited to the embodiments described below.

One embodiment of the present invention relates to a resin film containing a poly(3-hydroxyalkanoate) resin component.

(Poly(3-hydroxyalkanoate) Resin Component)

The poly(3-hydroxyalkanoate) resin component may consist of a single poly(3-hydroxyalkanoate) resin or may be a mixture of two or more poly(3-hydroxyalkanoate) resins. In terms of ease of control of the tensile modulus and swelling degree which are described later, the poly(3-hydroxyalkanoate) resin component is preferably a mixture of at least two poly(3-hydroxyalkanoate) resins differing in the types and/or contents of constituent monomers.

The poly(3-hydroxyalkanoate) resin is preferably a polymer containing 3-hydroxyalkanoate units, in particular a polymer containing units represented by the following formula (1).

[—CHR—CH$_2$—CO—O—]   (1)

In the formula (1), R is an alkyl group represented by $C_pH_{2p+1}$, and p is an integer from 1 to 15. Examples of R include linear or branched alkyl groups such as methyl, ethyl, propyl, methylpropyl, butyl, isobutyl, t-butyl, pentyl, and hexyl groups. The integer p is preferably from 1 to 10 and more preferably from 1 to 8.

The poly(3-hydroxyalkanoate) resin is particularly preferably a microbially produced poly(3-hydroxyalkanoate) resin. In the microbially produced poly(3-hydroxyalkanoate) resin, all of the 3-hydroxyalkanoate units are contained as (R)-3-hydroxyalkanoate units.

The poly(3-hydroxyalkanoate) resin preferably contains 50 mol % or more of 3-hydroxyalkanoate units (in particular, the repeating units represented by the formula (1)) in the total structural units, and the content of the 3-hydroxyalkanoate units is more preferably 60 mol % or more and even more preferably 70 mol % or more. The poly(3-hydroxyalkanoate) resin may contain only one type or two or more types of 3-hydroxyalkanoate units as polymer structural units or may contain other units (such as 4-hydroxyalkanoate units) in addition to the one type or two or more types of 3-hydroxyalkanoate units.

The poly(3-hydroxyalkanoate) resin is preferably a homopolymer or copolymer containing 3-hydroxybutyrate (hereinafter also referred to as "3HB") units. In particular, all of the 3-hydroxybutyrate units are preferably (R)-3-hydroxybutyrate units. The poly(3-hydroxyalkanoate) resin is preferably a copolymer of 3-hydroxybutyrate units and other hydroxyalkanoate units.

Specific examples of the poly(3-hydroxyalkanoate) resin include poly(3-hydroxybutyrate), poly(3-hydroxybutyrate-co-3-hydroxypropionate), poly(3-hydroxybutyrate-co-3-hydroxyvalerate) (abbreviated as P3HB3HV), poly(3-hydroxybutyrate-co-3-hydroxyvalerate-3-hydroxyhexanoate), poly(3-hydroxybutyrate-co-3-hydroxyhexanoate) (abbreviated as P3HB3HH), poly(3-hydroxybutyrate-co-3-hydroxyheptanoate), poly(3-hydroxybutyrate-co-3-hydroxyoctanoate), poly(3-hydroxybutyrate-co-3-hydroxynonanoate), poly(3-hydroxybutyrate-co-3-hydroxydecanoate), poly(3-hydroxybutyrate-co-3-hydroxyundecanoate), and poly(3-hydroxybutyrate-co-4-hydroxybutyrate) (abbreviated as P3HB4HB). In particular, poly(3-hydroxybutyrate-co-3-hydroxyhexanoate) and poly(3-hydroxybutyrate-co-4-hydroxybutyrate) are preferred in terms of factors such as the film productivity and the mechanical properties of the film.

In the case where the poly(3-hydroxyalkanoate) resin component includes a copolymer of 3-hydroxybutyrate units and other hydroxyalkanoate units, an average content ratio between the 3-hydroxybutyrate units and the other hydroxyalkanoate units in total monomer units constituting the poly(3-hydroxyalkanoate) resin component (3-hydroxybutyrate units/other hydroxyalkanoate units) is preferably from 93/7 to 80/20 (mol %/mol %), more preferably from 92/8 to 82/18 (mol %/mol %), and even more preferably from 90/10 to 84/16 (mol %/mol %) in order to ensure both the tearing resistance of the film and the film productivity.

The average content ratio between different monomer units in total monomer units constituting the poly(3-hydroxyalkanoate) resin component can be determined by a method known to those skilled in the art, such as by a method described in paragraph [0047] of WO 2013/147139. The "average content ratio" refers to a molar ratio between different monomer units in total monomer units constituting the poly(3-hydroxyalkanoate) resin component. In the case where the poly(3-hydroxyalkanoate) resin component is a mixture of two or more poly(3-hydroxyalkanoate) resins, the "average content ratio" refers to a molar ratio between different monomer units contained in the total mixture.

The weight-average molecular weight of the poly(3-hydroxyalkanoate) resin component is not limited to a particular range, but is preferably from $20\times10^4$ to $200\times10^4$, more preferably from $25\times10^4$ to $150\times10^4$, and even more preferably from $30\times10^4$ to $100\times10^4$ in order to ensure both the tearing resistance of the film and the film productivity.

In the case where the poly(3-hydroxyalkanoate) resin component is a mixture of two or more poly(3-hydroxyalkanoate) resins, the weight-average molecular weight of each poly(3-hydroxyalkanoate) resin is not limited to a particular range. For example, in the case of blending a high-crystallinity poly(3-hydroxyalkanoate) resin and a low-crystallinity poly(3-hydroxyalkanoate) resin which are described later, the weight-average molecular weight of the high-crystallinity poly(3-hydroxyalkanoate) resin is preferably from $20\times10^4$ to $100\times10^4$, more preferably from $22\times10^4$ to $80\times10^4$, and even more preferably from $25\times10^4$ to $60\times10^4$ in order to ensure both the tearing resistance of the film and the film productivity. The weight-average molecular weight of the low-crystallinity poly(3-hydroxyalkanoate) resin is preferably from $20\times10^4$ to $250\leq10^4$, more preferably from $25\times10^4$ to $230\times10^4$, and even more preferably from $30\times10^4$ to $200\times10^4$ in order to ensure both the tearing resistance of the film and the film productivity.

The weight-average molecular weight of the poly(3-hydroxyalkanoate) resin or poly(3-hydroxyalkanoate) resin component can be measured as a polystyrene-equivalent molecular weight by gel permeation chromatography (HPLC GPC system manufactured by Shimadzu Corporation) using a chloroform solution of the resin or resin component. The column used in the gel permeation chromatography may be any column suitable for weight-average molecular weight measurement.

The method for producing the poly(3-hydroxyalkanoate) resin is not limited to a particular technique, and may be a chemical synthesis production method or a microbial production method. A microbial production method is more preferred. The microbial production method used can be any known method. Known examples of bacteria that produce copolymers of 3-hydroxybutyrate with other hydroxyalkanoates include *Aeromonas caviae* which is a P3HB3HV- and P3HB3HH-producing bacterium and *Alcaligenes eutrophus* which is a P3HB4HB-producing bacterium. In particular, in order to increase the P3HB3HH productivity, *Alcaligenes eutrophus* AC32 (FERM BP-6038; see T. Fukui, Y. Doi, *J. Bacteria,* 179, pp. 4821-4830 (1997)) having a P3HA synthase gene introduced is more preferred. Such a microorganism is cultured under suitable conditions to allow the microorganism to accumulate P3HB3HH in its cells, and the microbial cells accumulating P3HB3HH are used. Instead of the above microorganism, a genetically modified microorganism having any suitable poly(3-hydroxyalkanoate) resin synthesis-related gene introduced may be used depending on the poly(3-hydroxyalkanoate) resin to be produced. The culture conditions including the type of the substrate may be optimized depending on the poly(3-hydroxyalkanoate) resin to be produced.

Additional Resin

The resin film according to one embodiment of the present invention may contain an additional resin in addition to the poly(3-hydroxyalkanoate) resin so long as the additional resin does not impair the effect of the present invention. Examples of the additional resin include: aliphatic polyester resins such as polybutylene succinate adipate, polybutylene succinate, polycaprolactone, and polylactic acid; and aliphatic-aromatic polyester resins such as polybutylene adipate terephthalate, polybutylene sebacate terephthalate, and polybutylene azelate terephthalate. The resin film may contain one additional resin or two or more additional resins.

The amount of the additional resin is not limited to a particular range, but is preferably 30 parts by weight or less, more preferably 20 parts by weight or less, and even more preferably 10 parts by weight or less per 100 parts by weight of the total amount of the poly(3-hydroxyalkanoate) resin component. The lower limit of the amount of the additional resin is not limited to a particular value and may be 0 part by weight.

Silica

The resin film according to one embodiment of the present invention may further contain silica in order to obtain an improving effect on the mechanical properties such as tearing resistance.

The silica is not limited to a particular type. In terms of usability, synthetic amorphous silica produced by a dry or wet process is preferred. Either hydrophobized or hydrophilized silica may be used. One type of silica may be used alone, or two or more types of silica may be used in combination.

The silica preferably has an adsorbed water content of 0.5 to 7 wt %. The adsorbed water content can be determined as the percentage of weight loss arising from evaporation at 160° C. and measured by means such as MX-50, an electromagnetic balance manufactured by Kensei Kogyo Co., Ltd. If the adsorbed water content is above 7 wt %, the silica particles could be difficult to disperse because of cohesion of the water adsorbed on the surfaces of the silica particles and between the particles and could, during film formation, be aggregated into fish eyes which cause appearance defects. If the adsorbed water content is below 0.5 wt %, the slight amount of water remaining between the particles is likely to form bridging liquid membranes which produce strong bonding forces by surface tension, making separation between and dispersion of the particles extremely difficult.

The average primary particle size of the silica is not limited to a particular range and may be in any range so long as the silica provides an improvement in the tearing resistance of the film, is not likely to cause appearance defects such as fish eyes in the film, and does not significantly reduce the transparency of the film. In order to reliably obtain an improving effect on the mechanical properties such as tearing resistance and achieve high transparency, the average primary particle size is preferably from 0.001 to 0.1 µm and particularly preferably from 0.005 to 0.05 µm. The average primary particle size can be determined as an arithmetic mean of the sizes of any 50 or more primary particles observed using a transmission electron microscope (TEM).

The silica content (total silica content) is preferably from 1 to 12 parts by weight per 100 parts by weight of the total amount of the poly(3-hydroxyalkanoate) resin component. If the silica content is below 1 part by weight, the addition of the silica could, in the composite of the poly(3-hydroxyalkanoate) resin component and the silica, fail to offer a sufficient level of improving effect on the mechanical properties such as tearing resistance. If the silica content is above 12 parts by weight, the silica could be difficult to disperse well. The silica content is more preferably 2 parts by weight or more and even more preferably 4 parts by weight or more. The silica content is more preferably 11 parts by weight or less and even more preferably 10 parts by weight or less.

The resin film according to one embodiment of the present invention can have a high tearing resistance even when the resin film is substantially free of silica. In the case where the resin film is substantially free of silica, the silica content (total silica content) may be below 0.1 parts by weight or below 0.01 parts by weight per 100 parts by weight of the total amount of the poly(3-hydroxyalkanoate) resin component.

The silica is preferably used in combination with a dispersion aid in order to increase the dispersibility of the silica.

Examples of the dispersion aid include glycerin ester compounds, adipic ester compounds, polyether ester compounds, phthalic ester compounds, isosorbide ester compounds, and polycaprolactone compounds. Among these, the following compounds are preferred because they have high affinity for the resin component and are less likely to cause bleed-out: modified glycerin compounds such as glycerin diacetomonolaurate, glycerin diacetomonocaprylate, and glycerin diacetomonodecanoate; adipic ester compounds such as diethylhexyl adipate, dioctyl adipate, and diisononyl adipate; and polyether ester compounds such as polyethylene glycol dibenzoate, polyethylene glycol dicaprylate, and polyethylene glycol diisostearate. Dispersion aids containing a large amount of biomass-derived component are particularly preferred in order to increase the overall biomass degree of the resulting composition. Examples of such dispersion aids include RIKEMAL™ PL series of Riken Vitamin Co., Ltd. and Polysorb series of Roquette Freres. One dispersion aid may be used alone, or two or more dispersion aids may be used in combination.

The dispersion aid content (total dispersion aid content) is preferably from 0.1 to 20 parts by weight per 100 parts by weight of the total amount of the poly(3-hydroxyalkanoate) resin component. If the dispersion aid content is below 0.1 parts by weight, the dispersion aid could fail to satisfactorily perform the function of allowing the silica to be dispersed well, or the addition of the silica could, in the composite of the polyhydroxyalkanoate resin component, silica, and dispersion aid, fail to offer a sufficient level of improving effect on the mechanical properties such as tearing resistance. If the dispersion aid content is above 20 parts by weight, the dispersion aid could cause bleed-out. The dispersion aid content is more preferably 0.3 parts by weight or more and even more preferably 0.5 parts by weight or more. The dispersion aid content is more preferably 10 parts by weight or less and even more preferably 5 parts by weight or less.

Additive

The resin film according to one embodiment of the present invention may contain an additive so long as the additive does not impair the effect of the present invention. Examples of the additive include a nucleating agent, a lubricant, a plasticizer, an antistatic, a flame retardant, a conductive additive, a heat insulator, a crosslinking agent, an antioxidant, an ultraviolet absorber, a colorant, an inorganic filler, an organic filler, and a hydrolysis inhibitor, and these additives can be used depending on the intended purpose. Biodegradable additives are particularly preferred.

Examples of the nucleating agent include pentaerythritol, orotic acid, aspartame, cyanuric acid, glycine, zinc phenylphosphonate, and boron nitride. Among these, pentaerythritol is preferred because it is particularly superior in the accelerating effect on crystallization of the poly(3-hydroxyalkanoate) resin component.

The amount of the nucleating agent used is not limited to a particular range, but is preferably from 0.1 to 5 parts by weight, more preferably from 0.5 to 3 parts by weight, and even more preferably from 0.7 to 1.5 parts by weight per 100 parts by weight of the total amount of the poly(3-hydroxyalkanoate) resin component. One nucleating agent may be used alone, or two or more nucleating agents may be used. The proportions of the nucleating agents used may be adjusted as appropriate depending on the intended purpose.

Examples of the lubricant include behenamide, oleamide, erucamide, stearamide, palmitamide, N-stearyl behenamide, N-stearyl erucamide, ethylenebisstearamide, ethylenebisoleamide, ethylenebiserucamide, ethylenebislaurylamide, ethylenebiscapramide, p-phenylenebisstearamide, and a polycondensation product of ethylenediamine, stearic acid, and sebacic acid. Among these, behenamide and erucamide are preferred because they are particularly superior in the lubricating effect on the poly(3-hydroxyalkanoate) resin component.

The amount of the lubricant used is not limited to a particular range, but is preferably from 0.01 to 5 parts by weight, more preferably from 0.05 to 3 parts by weight, and even more preferably from 0.1 to 1.5 parts by weight per 100 parts by weight of the total amount of the poly(3-hydroxyalkanoate) resin component. One lubricant may be used alone, or two or more lubricants may be used. The proportions of the lubricants used can be adjusted as appropriate depending on the intended purpose.

Examples of the plasticizer include glycerin ester compounds, citric ester compounds, sebacic ester compounds, adipic ester compounds, polyether ester compounds, benzoic ester compounds, phthalic ester compounds, isosorbide ester compounds, polycaprolactone compounds, and dibasic ester compounds. Among these, glycerin ester compounds, citric ester compounds, sebacic ester compounds, and dibasic ester compounds are preferred because they are particularly superior in the plasticizing effect on the poly(3-hydroxyalkanoate) resin component. Examples of the glycerin ester compounds include glycerin diacetomonolaurate. Examples of the citric ester compounds include tributyl acetylcitrate. Examples of the sebacic ester compounds include dibutyl sebacate. Examples of the dibasic ester compounds include benzyl methyl diethylene glycol adipate.

The amount of the plasticizer used is not limited to a particular range, but is preferably from 1 to 20 parts by weight, more preferably from 2 to 15 parts by weight, and even more preferably from 3 to 10 parts by weight per 100 parts by weight of the total amount of the poly(3-hydroxyalkanoate) resin component. One plasticizer may be used alone, or two or more plasticizers may be used. The proportions of the plasticizers used can be adjusted as appropriate depending on the intended purpose.

Tensile Modulus of Resin Film

The resin film according to one embodiment of the present invention meets the requirement that the tensile modulus be from 500 to 2000 MPa. If the tensile modulus is above 2000 MPa, it is difficult for the resin film to exhibit a sufficient level of tearing resistance. If the tensile modulus is below 500 MPa, the resin film has difficulty recovering its original shape when deformed by an applied force, and such a resin film tends to have poor usability.

The tensile modulus is preferably 1800 MPa or less, more preferably 1700 MPa or less, even more preferably 1600 MPa or less, and particularly preferably 1500 MPa or less. The tensile modulus is preferably 600 MPa or more, more preferably 700 MPa or more, and even more preferably 800 MPa or more.

To determine the tensile modulus, the resin film is subjected to a tensile test at a tensile speed of 100 mm/min using a tensile tester (EZ-LX 11th, manufactured by Shimadzu Corporation) according to JIS K 7127. The tensile modulus is calculated based on an S-S curve obtained by the tensile test.

The tensile modulus can be controlled, for example, by adjusting the average content of the other hydroxyalkanoate units in total monomer units constituting the poly(3-hydroxyalkanoate) resin component.

Swelling Degree of Resin Film

The resin film meets the requirement that a swelling degree of the resin film, as measured by immersion of the resin film in methyl ethyl ketone for two hours, be from 1 to 5. To determine the swelling degree, the resin film is swollen by immersing it in methyl ethyl ketone at room temperature (23° C.) for two hours, and then the weight of the swollen film is measured. The swelling degree is calculated from the following equation.

Swelling degree=(weight of swollen resin film/ weight of non-swollen resin film)

A value of the swelling degree closer to 1 indicates that the resin film less readily absorbs methyl ethyl ketone, and a greater value of the swelling degree indicates that the resin film more readily absorbs methyl ethyl ketone.

The swelling degree is a measure indicating the density of tie molecules contained in the poly(3-hydroxyalkanoate) resin component. The tie molecules are molecules that cross-link fine resin crystal grains to one another in the resin component, and the formation of a network by the tie molecules can provide a marked increase in the tearing resistance of the film formed from the poly(3-hydroxyalkanoate) resin component. When the density of the tie molecules is high, the resin film does not absorb methyl ethyl ketone readily, and this results in a relatively low value of the swelling degree.

If the swelling degree is above 5 and the density of the tie molecules is low, the poly(3-hydroxyalkanoate) resin film cannot have a sufficiently high tearing resistance. The swelling degree is preferably 4 or less, more preferably 3.5 or less, even more preferably 3 or less, and particularly preferably 2.5 or less.

To assess the impact of the swelling degree on the tearing resistance, it is desirable to make a comparison between poly(3-hydroxyalkanoate) resin components containing similar amounts of resin crystals. Specifically, since the amount of resin crystals contained in a poly(3-hydroxyalkanoate) resin component depends on the contents of the comonomers, it is desirable to make a comparison between resin components similar in the contents of the comonomers.

The swelling degree can be controlled, for example, by forming the poly(3-hydroxyalkanoate) resin component as a mixture of at least two poly(3-hydroxyalkanoate) resins which differ in the types and/or contents of constituent monomers and each of which is a copolymer of 3-hydroxybutyrate units and other hydroxyalkanoate units. In particular, when the poly(3-hydroxyalkanoate) resin component contains a copolymer (A) which is a copolymer of 3-hydroxybutyrate units and other hydroxyalkanoate units and in which the content of the other hydroxyalkanoate units is from 1 to 6 mol % and a copolymer (B) which is a copolymer of 3-hydroxybutyrate units and other hydroxyalkanoate units and in which the content of the other hydroxyalkanoate units is 24 mol % or more, it is easy to control the swelling degree to 5 or less and the tensile modulus in the range of 500 to 2000 MPa. The details of the copolymers will be described later.

Tearing Resistance of Resin Film

The resin film can exhibit a high tearing resistance and resist being torn or broken. The tearing resistance of the resin film, as measured as an Elmendorf tearing resistance, is preferably 2 N/mm or more, more preferably 4 N/mm or more, even more preferably 6 N/mm or more, and particularly preferably 8 N/mm or more.

The upper limit of the tearing resistance is not limited to a particular value. In terms of the ease with which the resin film is slit, the tearing resistance is preferably 200 N/mm or less, more preferably 100 N/mm or less, even more preferably 80 N/mm or less, and particularly preferably 60 N/mm or less.

The Elmendorf tearing resistance is determined as follows: the film is tested for tearing resistance using a light load-type tearing tester (NO. 2037 special model, manufactured by Kumagai Riki Kogyo Co., Ltd.) having a function and structure conforming with those of a standard Elmendorf tearing tester as specified in JIS P-8116, and the measurement value is divided by the thickness (mm) of the film.

Thickness of Resin Film

The thickness of the resin film is not limited to a particular range, but is preferably from 10 µm to 1 mm, more preferably from 15 to 500 µm, and even more preferably from 20 to 300 µm. The resin film of the present application may be a product having a thickness corresponding to that of what is commonly called a sheet.

Method for Producing Resin Film

Examples of the method for producing the resin film according to one embodiment of the present invention include: a method which is used when the poly(3-hydroxyalkanoate) resin component contains a copolymer and which consists of adjusting the contents of monomers constituting the copolymer; and a method consisting of mixing at least two poly(3-hydroxyalkanoate) resins differing in the types and/or contents of constituent monomers. Particularly preferred is the method consisting of mixing at least two poly(3-hydroxyalkanoate) resins differing in the types and/or contents of constituent monomers.

In the case of mixing at least two poly(3-hydroxyalkanoate) resins, it is preferable to combine and mix at least one high-crystallinity poly(3-hydroxyalkanoate) resin and at least one low-crystallinity poly(3-hydroxyalkanoate) resin. In general, high-crystallinity poly(3-hydroxyalkanoate) resins are superior in terms of productivity but have low mechanical strength, while low-crystallinity poly(3-hydroxyalkanoate) resins have good mechanical properties although being inferior in terms of productivity. With the use of a high-crystallinity poly(3-hydroxyalkanoate) resin and a low-crystallinity poly(3-hydroxyalkanoate) resin, it is expected that the high-crystallinity poly(3-hydroxyalkanoate) resin forms fine resin crystal grains and the low-crystallinity poly(3-hydroxyalkanoate) resin forms tie molecules that cross-link the resin crystal grains to one another. The combined use of these resins can provide a marked increase in the tearing resistance of the resin film.

In the case where the high-crystallinity poly(3-hydroxyalkanoate) resin contains 3-hydroxybutyrate units, the content of the 3-hydroxybutyrate units in the high-crystallinity poly(3-hydroxyalkanoate) resin is preferably higher than the average content of 3-hydroxybutyrate units in total monomer units constituting the poly(3-hydroxyalkanoate) resin component.

In the case where the high-crystallinity poly(3-hydroxyalkanoate) resin contains 3-hydroxybutyrate units and other hydroxyalkanoate units, the content of the other hydroxyalkanoate units in the high-crystallinity resin is preferably from 1 to 10 mol %, more preferably from 1 to 8 mol %, and even more preferably from 1 to 6 mol %.

The high-crystallinity poly(3-hydroxyalkanoate) resin component is preferably poly(3-hydroxybutyrate-co-3-hydroxyhexanoate) or poly(3-hydroxybutyrate-co hydroxybutyrate) and more preferably poly(3-hydroxybutyrate-co-3-hydroxyhexanoate).

In the case where the low-crystallinity poly(3-hydroxyalkanoate) resin contains 3-hydroxybutyrate units, the content of the 3-hydroxybutyrate units in the low-crystallinity poly(3-hydroxyalkanoate) resin is preferably lower than the average content of 3-hydroxybutyrate units in total monomer units constituting the poly(3-hydroxyalkanoate) resin component.

In the case where the low-crystallinity poly(3-hydroxyalkanoate) resin contains 3-hydroxybutyrate units and other hydroxyalkanoate units, the content of the other hydroxyalkanoate units in the low-crystallinity resin is preferably from 24 to 99 mol %, more preferably from 24 to 50 mol %, even more preferably from 24 to 35 mol %, and particularly preferably from 24 to 30 mol %.

The low-crystallinity poly(3-hydroxyalkanoate) resin is preferably poly(3-hydroxybutyrate-co-3-hydroxyhexanoate) or poly(3-hydroxybutyrate-co-4-hydroxybutyrate) and more preferably poly(3-hydroxybutyrate-co-3-hydroxyhexanoate).

In the case of using the high-crystallinity poly(3-hydroxyalkanoate) resin and the low-crystallinity poly(3-hydroxyalkanoate) resin in combination, the proportion of each resin to the total amount of the two resins is not limited to a particular range. Preferably, the proportion of the high-crystallinity poly(3-hydroxyalkanoate) resin is from 35 to 90 wt %, and the proportion of the low-crystallinity poly(3-hydroxyalkanoate) resin is from 10 to 65 wt %. More preferably, the proportion of the high-crystallinity poly(3-hydroxyalkanoate) resin is from 45 to 80 wt %, and the proportion of the low-crystallinity poly(3-hydroxyalkanoate) resin is from 20 to 55 wt %.

The method for obtaining a blend of two or more poly(3-hydroxyalkanoate) resins is not limited to a particular technique. The blend may be obtained by microbial production or chemical synthesis. Alternatively, the blend may be obtained by melting and kneading the two or more resins using an extruder, a kneader, a Banbury mixer, or a roll-mill or by dissolving and mixing the two or more resins in a solvent and drying the resulting mixture.

The resin film according to one embodiment of the present invention can be produced by any of various molding methods such as T-die extrusion molding, inflation molding, and calendering. The details of the production conditions may be set as appropriate. In an inflation method, for example, it is preferable to dry pellets to a water content of 500 ppm or less by means such as a dehumidifying dryer before inflation molding and set the cylinder to a temperature of 100 to 160° C. and the adapter and die to a temperature of 130 to 160° C.

The resin film according to one embodiment of the present invention has high biodegradability and is thus suitable for use in various fields such as agricultural industry, fishery industry, forestry industry, horticultural industry, medical industry, hygiene industry, food industry, apparel industry, non-apparel industry, packing industry, automotive industry, building material industry, and various other industries. For example, the resin film can be used in various products such as a garbage bag, a checkout bag, a packing bag for vegetables and fruits, a pillow packing bag, a mulch film for agriculture, a fumigation sheet for forestry, a banding tape including a flat yarn, a root wrapping film for garden plants, a back sheet of a diaper, a sheet for packing, a shopping bag, a draining bag, and a compost bag.

EXAMPLES

Hereinafter, the present invention will be specifically described using examples. The technical scope of the present invention is not limited by the examples given below.

The following describes the materials used in Examples and Comparative Examples.

[Poly(3-hydroxyalkanoate) Resins]

P3HB3HH-1: P3HB3HH (average content ratio 3HB/3HH=97.2/2.8 (mol %/mol %), weight-average molecular weight=66×10$^4$ g/mol)

This resin was produced according to a method as described in Example 2 of WO 2019/142845.

P3HB3HH-2: P3HB3HH (average content ratio 3HB/3HH=71.8/28.2 (mol %/mol %), weight-average molecular weight=66×10$^4$ g/mol)

This resin was produced according to a method as described in Example 9 of WO 2019/142845.

P3HB3HH-3: X131A (Kaneka Biodegradable Polymer PHBH™, average content ratio 3HB/3HH=94/6 (mol %/mol %), weight-average molecular weight=60×10$^4$ g/mol)

P3HB3HH-4: P3HB3HH (average content ratio 3HB/3HH=83/17 (mol %/mol %), weight-average molecular weight =70×10$^4$ g/mol)

This resin was produced according to a method as described in Example 7 of WO 2019/142845.

For the case where a mixture of two or more poly(3-hydroxyalkanoate) resins was used as the poly(3-hydroxyalkanoate) resin component, the value of average HH content shown in Table 1 is an average value calculated from the 3HH content in each of the poly(3-hydroxyalkanoate) resins and the proportions by weight of the poly(3-hydroxyalkanoate) resins.

Additives

Additive-1: Pentaerythritol (Neulizer P, manufactured by Mitsubishi Chemical Corporation)
Additive-2: Behenamide (BNT-22H, manufactured by Nippon Fine Chemical Co., Ltd.)
Additive-3: Erucamide (NEUTRON-S, manufactured by Nippon Fine Chemical Co., Ltd.)

The following describes methods used for evaluation in Examples and Comparative Examples.

Evaluation of Swelling Degree

Preparation of Film

A polyimide film was placed on a 2-mm-thick SUS plate (30 cm×35 cm), and 2.0 g of resin composition pellets were placed on the polyimide film. A 200-μm-thick shim plate was placed as a spacer to surround the resin composition pellets. After that, a plate identical to the above SUS plate was placed on the resin composition pellets to sandwich the resin composition pellets between the SUS plates. The sandwiched pellets were placed on the hot press plate of a press machine (Compression Molding Machine NSF-50, manufactured by Sinto Metal Industries, Ltd.) which was heated to 170° C., and were preheated for 5 minutes. After the preheating, the pressure was slowly increased to 5 MPa over 2 minutes, and the increased pressure was maintained for 2 minutes. The pressing was followed by cooling to a room temperature on a cooling plate cooled to about 20° C., and thus an about 200-μm-thick film was obtained. This film was aged at a room temperature of 23° C. and a humidity of 50% for 1 week, and the aged film was used as a film sample for swelling degree measurement.

Measurement of Swelling Degree

The film sample was cut to obtain a film piece with a weight of about 0.5 g. This film piece was used as a non-swollen sample, the exact weight of which was measured by means of an electronic scale. The sample was then immersed in methyl ethyl ketone (MEK) at room temperature (23° C.) for 2 hours. After the immersion, the sample was taken out, and MEK was quickly wiped off from the surface of the sample with Kim Wipe, and the weight of the swollen sample was measured. The swelling degree of the sample was calculated from the following equation.

Swelling degree =(weight of swollen sample/weight of non-swollen sample)

Tensile Test: Evaluation of Tensile Modulus

Preparation of Film

A polyimide film was placed on a 2-mm-thick SUS plate (30 cm×35 cm), and 2.0 g of resin composition pellets were placed on the polyimide film. A 100-μm-thick shim plate was placed as a spacer to surround the resin composition pellets. After that, a plate identical to the above SUS plate was placed on the resin composition pellets to sandwich the resin composition pellets between the SUS plates. The sandwiched pellets were placed on the hot press plate of a press machine (Compression Molding Machine NSF-50, manufactured by Sinto Metal Industries, Ltd.) which was heated to 170° C., and were preheated for 5 minutes. After the preheating, the pressure was slowly increased to 5 MPa over 2 minutes, and the increased pressure was maintained for 2 minutes. The pressing was followed by cooling to a room temperature on a cooling plate cooled to about 20° C., and thus an about 100-μm-thick film was obtained. This film was aged at a room temperature of 23° C. and a humidity of 50% for 1 week, and the aged film was used as a film sample for tensile modulus measurement.

Measurement of Tensile Modulus

The film sample was subjected to a tensile test at a tensile speed of 100 mm/min using a tensile tester (EZ-LX 1kN, manufactured by Shimadzu Corporation) according to JIS K 7127. The tensile modulus was calculated based on an S-S curve obtained by the tensile test.

Evaluation of Tearing Resistance

Preparation of Film

A polyimide film was placed on a 2-mm-thick SUS plate (30 cm×35 cm), and 2.0 g of resin composition pellets were placed on the polyimide film. A 50-μm-thick shim plate was placed as a spacer to surround the resin composition pellets. After that, a plate identical to the above SUS plate was placed on the resin composition pellets to sandwich the resin composition pellets between the SUS plates. The sandwiched pellets were placed on the hot press plate of a press machine (Compression Molding Machine NSF-50, manufactured by Sinto Metal Industries, Ltd.) which was heated to 170° C., and were preheated for 5 minutes. After the preheating, the pressure was slowly increased to 5 MPa over 2 minutes, and the increased pressure was maintained for 2 minutes. The pressing was followed by cooling to a room temperature on a cooling plate cooled to about 20° C., and thus an about 50-μm-thick film was obtained. This film was aged at a room temperature of 23° C. and a humidity of 50% for 1 week, and the aged film was used as a film sample for tearing resistance measurement.

Measurement of Tearing Resistance

The film sample was tested for tearing resistance using a light load-type tearing tester (NO. 2037 special model, manufactured by Kumagai Riki Kogyo Co., Ltd.) having a function and structure conforming with those of a standard Elmendorf tearing tester as specified in JIS P-8116, and the measurement value was divided by the thickness (mm) of the film sample. The resulting value was adopted as the Elmendorf tearing resistance of the film sample.

Evaluation of Productivity

A small-sized kneader (DSM Xplore 5, model 2005, manufactured by DSM) was used to knead about 4.5 g of a film raw material at a barrel temperature of 170° C. and a screw rotational speed of 100 rpm for 5 minutes. After that, a molten resin composition in the shape of a strand was discharged from a die, then the discharged strand was immediately put into a water bath heated to 60° C., and the time taken for the strand to become crystalized and solidified was measured. The productivity was rated as good when the strand became solidified within 100 seconds.

Example 1

An amount of 1.76 g of P3HB3HH-1 and 2.74 g of P3HB3HH-2 were blended to give a resin formulation shown in Table 1. To the blend were added 0.045 g of Additive-1, 0.0225 g of Additive-2, and 0.0225 g of Additive-3. The resulting mixture was placed into a small-sized kneader (DSM Xplore 5, model 2005, manufactured by DSM) and kneaded at a barrel temperature of 170° C. and a screw rotational speed of 100 rpm for 5 minutes. Immediately after completion of the kneading, a molten resin composition in the shape of a strand was discharged from a die, and the discharged strand was put into a water bath heated to 60° C. to evaluate the productivity. The productivity was rated as good. After that, the strand solidified in the water bath was cut into resin composition pellets by means of a nipper.

A film was produced from the resin composition pellets using a press machine. The film was aged for 1 week, after which the swelling degree, tensile modulus, and tearing resistance of the film were measured. The swelling degree was measured to be 2.73, the tensile modulus was measured to be 508 MPa, and the tearing resistance was measured to be 69.7 N/mm. The results are summarized in Table 1.

Examples 2 To 9 and Comparative Examples 1 And 2

Resin composition pellets were produced in the same manner as in Example 1, except that the resin formulation was changed as shown in Table 1, and evaluation procedures identical to those in Example 1 were conducted. The results are summarized in Table 1.

TABLE 1

| | Resin formulation | | | | | | Average | | | | |
| | First component | | Second component | | Third component | | HH content (mol %) | Tensile modulus (MPa) | Swelling degree | Productivity | Tearing resistance (N/mm) |
| | Resin | Amount (wt %) | Resin | Amount (wt %) | Resin | Amount (wt %) | | | | | |
| --- | --- | --- | --- | --- | --- | --- | --- | --- | --- | --- | --- |
| Example 1 | P3HB3HH-1 | 39 | P3HB3HH-2 | 61 | — | — | 17.8 | 508 | 2.73 | Good | 69.7 |
| Example 2 | P3HB3HH-1 | 45 | P3HB3HH-2 | 55 | — | — | 16.2 | 665 | 1.88 | Good | 53.8 |
| Example 3 | P3HB3HH-1 | 49 | P3HB3HH-2 | 51 | — | — | 15.3 | 700 | 1.82 | Good | 43.7 |
| Example 4 | P3HB3HH-1 | 40 | P3HB3HH-2 | 40 | P3HB3HH-3 | 20 | 13.4 | 856 | 1.72 | Good | 30.7 |
| Example 5 | P3HB3HH-1 | 35 | P3HB3HH-2 | 35 | P3HB3HH-3 | 30 | 12.5 | 971 | 1.54 | Good | 27.4 |

TABLE 1-continued

| | Resin formulation | | | | | Average | | | | |
| | First component | | Second component | | Third component | | HH | Tensile | | | Tearing |
| | Resin | Amount (wt %) | Resin | Amount (wt %) | Resin | Amount (wt %) | content (mol %) | modulus (MPa) | Swelling degree | Productivity | resistance (N/mm) |
|---|---|---|---|---|---|---|---|---|---|---|---|
| Example 6 | P3HB3HH-1 | 30 | P3HB3HH-2 | 30 | P3HB3HH-3 | 40 | 11.5 | 1087 | 1.47 | Good | 17.6 |
| Example 7 | P3HB3HH-1 | 25 | P3HB3HH-2 | 25 | P3HB3HH-3 | 50 | 10.6 | 1267 | 1.43 | Good | 10.9 |
| Example 8 | P3HB3HH-1 | 20 | P3HB3HH-2 | 20 | P3HB3HH-3 | 60 | 9.7 | 1442 | 1.27 | Good | 7.9 |
| Example 9 | P3HB3HH-1 | 15 | P3HB3HH-2 | 15 | P3HB3HH-3 | 70 | 8.7 | 1505 | 1.22 | Good | 6.7 |
| Comp. Example 1 | P3HB3HH-3 | 100 | — | — | — | — | 6 | 2212 | 1.30 | Good | 1.5 |
| Comp. Example 2 | P3HB3HH-4 | 100 | — | — | — | — | 17 | 666 | 5.12 | Poor | 3.6 |

Table 1 reveals the following findings. The films of Examples 1 to 9 had a tensile modulus of 500 to 2000 MPa and a swelling degree of 1 to 5. The time taken for the resin compositions to become crystalized and solidified was short, and the productivity was good. The resulting films had a high tearing resistance.

In contrast, the film of Comparative Example 1 had too high a tensile modulus although the swelling degree was in the range of 1 to 5. While the productivity was good, the tearing resistance was low.

The film of Comparative Example 2 had a tensile modulus of 500 to 2000 MPa but had a swelling degree of 5.12 which is excessively large, and the productivity was poor. Comparison between Comparative Example 2 and Example 1 or 2, which were similar in average HH content, reveals that controlling the swelling degree to 5 or less as in Example 1 or 2 provided a marked increase, in particular a more than 10-fold increase, in tearing resistance.

The invention claimed is:

1. A resin film, comprising:
   a poly(3-hydroxyalkanoate) resin component comprising a copolymer (A) which is a copolymer of 3-hydroxybutyrate units and other hydroxyalkanoate units and in which a content of the other hydroxyalkanoate units is from 1 to 6 mol %, and a copolymer (B) which is a copolymer of 3-hydroxybutyrate units and other hydroxyalkanoate units and in which a content of the other hydroxyalkanoate units is at least 24 mol %,
   wherein in the poly(3-hydroxyalkanoate) resin component, a proportion of the copolymer (A) is from 35 wt % to 80 wt %, and a proportion of the copolymer (B) is from 20 wt % to 65 wt %, the other hydroxyalkanoate units in the copolymer (B) are 3-hydroxyhexanoate units,
   a tensile modulus of the resin film is from 500 to 1,500 MPa, and
   a swelling degree of the resin film, as measured by immersion of the resin film in methyl ethyl ketone for two hours, is from 1 to 5.

2. The resin film according to claim 1, wherein an average content of the other hydroxyalkanoate units in total monomer units constituting the poly(3-hydroxyalkanoate) resin component is from 8 to 18 mol %.

3. The resin film according claim 1, wherein a tearing resistance of the resin film is from 7.9 to 200 N/mm.

4. The resin film according to claim 1, wherein a thickness of the resin film is from 10 μm to 1 mm.

5. The resin film according to claim 1, wherein the other hydroxyalkanoate units in the copolymer (A) are 3-hydroxyhexanoate units.

6. The resin film according to claim 5, wherein in the poly(3-hydroxyalkanoate) resin component, the proportion of the copolymer (A) is from 45 to 80 wt %, and the proportion of the copolymer (B) is from 20 to 55 wt %.

7. The resin film according to claim 1, wherein the other hydroxyalkanoate units in the copolymer (A) are selected from the group consisting of 3-hydroxyhexanoate units and 4-hydroxybutyrate units.

8. The resin film according to claim 1, wherein the tensile modulus of the resin film is from 600 to 1,500 MPa.

9. The resin film according to claim 1, wherein the tensile modulus of the resin film is from 700 to 1.500 MPa.

10. The resin film according to claim 1, wherein the swelling degree of the resin film, as measured by immersion of the resin film in methyl ethyl ketone for two hours, is from 1 to 4.

11. The resin film according to claim 1, wherein the swelling degree of the resin film, as measured by immersion of the resin film in methyl ethyl ketone for two hours, is from 1 to 2.5.

12. The resin film according to claim 1, wherein in the poly(3-hydroxyalkanoate) resin component, the proportion of the copolymer (A) is from 45 to 80 wt %, and the proportion of the copolymer (B) is from 20 to 55 wt %.

13. The resin film according to claim 1, wherein the content of the other hydroxyalkanoate units in the copolymer (B) is from 24 mol % to 50 mol %.

14. The resin film according to claim 1, wherein the content of the other hydroxyalkanoate units in the copolymer (B) is from 24 mol % to 35 mol %.

15. The resin film according to claim 1, wherein the content of the other hydroxyalkanoate units in the copolymer (B) is from 24 mol % to 30 mol %.

16. The resin film according to claim 1, wherein in the poly(3-hydroxyalkanoate) resin component, the proportion of the copolymer (A) is from 35 wt % to 49 wt %, and the proportion of the copolymer (B) is from 51 wt % to 65 wt %.

* * * * *